United States Patent
Zhang

(10) Patent No.: US 12,369,588 B2
(45) Date of Patent: Jul. 29, 2025

(54) BIO-LIGHT ELEMENT, AND PREPARATION METHOD AND USE THEREOF

(71) Applicant: Junhua Zhang, Xi'an (CN)

(72) Inventor: Junhua Zhang, Xi'an (CN)

( * ) Notice: Subject to any disclaimer, the term of this patent is extended or adjusted under 35 U.S.C. 154(b) by 684 days.

(21) Appl. No.: 17/848,726

(22) Filed: Jun. 24, 2022

(65) Prior Publication Data

US 2023/0123025 A1    Apr. 20, 2023

(30) Foreign Application Priority Data

Oct. 15, 2021 (CN) .......................... 202111201813.3

(51) Int. Cl.
*A01N 59/00* (2006.01)
*A01N 25/34* (2006.01)
*A01N 59/16* (2006.01)
*A01P 1/00* (2006.01)

(52) U.S. Cl.
CPC .............. *A01N 59/00* (2013.01); *A01N 25/34* (2013.01); *A01N 59/16* (2013.01); *A01P 1/00* (2021.08)

(58) Field of Classification Search
CPC ........ A01N 59/00; A01N 25/34; A01N 59/16; A01P 1/00; Y02A 50/30; A61K 41/0038; A61K 9/7023; A61K 33/00; A61K 33/10; A61K 33/12; A61K 33/30; A61P 17/00; A61P 29/00; A61P 31/04; A61P 31/10; A61P 43/00; D06M 11/44; D06M 11/79; D06M 16/00
See application file for complete search history.

(56) References Cited

FOREIGN PATENT DOCUMENTS

CN        105816271 A  *  8/2016

OTHER PUBLICATIONS

CN-105816271-A machine translation (Year: 2016).*

* cited by examiner

*Primary Examiner* — Mina Haghighatian
*Assistant Examiner* — Nathan W Schlientz
(74) *Attorney, Agent, or Firm* — Bookoff McAndrews, PLLC

(57) ABSTRACT

Disclosed is a bio-light element, and a preparation method and use thereof. The bio-light element provided by the disclosure includes the following components in parts by mass: 15-35 parts of a jade, 20-40 parts of a stone needle, 20-35 parts of a silicon dioxide ore, and 10-25 parts of zinc oxide.

20 Claims, No Drawings

BIO-LIGHT ELEMENT, AND PREPARATION METHOD AND USE THEREOF

CROSS REFERENCE TO RELATED APPLICATION

This patent application claims the benefit and priority of Chinese Patent Application No. 202111201813.3, entitled "Bio-light element, and preparation method and use thereof" filed on Oct. 15, 2021, the disclosure of which is incorporated by reference herein in its entirety as part of the present application.

TECHNICAL FIELD

The present disclosure relates to the technical field of medical health care products, and in particular to a bio-light element, and a preparation method and use thereof.

BACKGROUND ART

A bio-light element is a brand-new medical bio-functional composite material. It is a crystallization product of multiple technologies such as biomedical optical quantum amorphous technology and could regulate the functions of a human body. In the treasure house of traditional medicine of China, a jade could be used as a medicine, is natured and sweet, and has the functions of relieving restlessness and quenching thirst, nourishing the spirit and improving eyesight, centering the mind and fixing the eyesight, growing hair, and helping the voice and throat. As demonstrated by research of mineral medicine, the jade has high-intensity electrons, and electron diffraction thereof could release huge energy enough to affect the bioelectricity of the human body, stimulate endocrine and regulate metabolism; and the jade also has a special photoelectric effect, and could form an electromagnetic field in the process of cutting, grinding and polishing. These effects are accumulated to form a resonator, which could resonate with the human body and make all parts of the human body operate more harmoniously. Meanwhile, the jade also contains various beneficial trace elements such as zinc, copper, germanium, cobalt, nickel, manganese and selenium, and has an effect of balancing physiological functions. Therefore, in the prior art, the jade is usually used for manufacturing the bio-light element, and meanwhile, in order to improve the efficacy of the bio-light element, it is usually selected to add pearl powder, chitin, diamond and the like. The high cost of the pearl powder, chitin, diamond and the like results in a high cost of the bio-light element. Meanwhile, the bio-light element has an effect of promoting microcirculation, and promoting the discharge of organic matters and sweating on the surface of skin, which may easily cause the growth of bacteria and microorganisms. As a result, when the bio-light element is used in a medical analgetic plaster, it is difficult for the bio-light element to inhibit inflammation and needs to add other anti-inflammatory components, and when the bio-light element is used in a textile, it is easy for the textile to produce off-odor, which greatly limits the popularization and application of the bio-light element. Therefore, it is necessary to provide a bio-light element with low cost and excellent bactericidal and bacteriostatic effects.

SUMMARY

An object of the present disclosure is to provide a bio-light element, and a preparation method and use thereof. The bio-light element provided by the present disclosure has good bactericidal and bacteriostatic effects, could be used in a medical analgetic plaster and a textile to achieve a good medical care effect, and has relatively lower production cost.

In order to realize the above object of the present disclosure, the present disclosure provides the following technical solutions.

The present disclosure provides a bio-light element, including the following components in parts by mass: 15-35 parts of a jade, 20-40 parts of a stone needle, 20-35 parts of a silicon dioxide ore, and 10-25 parts of zinc oxide.

In some embodiments, the bio-light element includes the following components in parts by mass: 20-25 parts of the jade, 30-40 parts of the stone needle, 25-30 parts of the silicon dioxide ore, and 10-25 parts of zinc oxide.

In some embodiments, each of the jade, stone needle, silicon dioxide ore and zinc oxide independently has a median particle size ($D_{50}$) of not larger than 1 μm.

In some embodiments, each of the jade, stone needle and silicon dioxide ore independently has a purity of not lower than 95 wt. %.

In some embodiments, the jade has a density of 2.4-4.2 kg/L.

In some embodiments, the stone needle has a density of 2.6-2.9 kg/L.

In some embodiments, the silicon dioxide ore has a density of 2.5-2.9 kg/L.

The present disclosure provide a method for preparing the bio-light element according to the above technical solutions, including the following steps:

(1) respectively subjecting the jade, the stone needle and the silicon dioxide ore to a pulverizing, a wet ball milling and an ultrafine pulverizing sequentially to obtain an ultrafine jade, an ultrafine stone needle and an ultrafine silicon dioxide ore;

(2) mixing zinc oxide with a part of the ultrafine jade obtained in step (1), and subjecting the resulting mixture to an ultrafine pulverizing to obtain an ultrafine mixture; and (3) mixing the ultrafine stone needle, the ultrafine silicon dioxide ore and the rest ultrafine jade obtained in step (1) with the ultrafine mixture obtained in step (2) to obtain the bio-light element.

In some embodiments, in step (2), a mass ratio of zinc oxide to the part of the ultrafine jade is in a range of 5:(1-2).

The present disclosure provides use of the bio-light element described in the above technical solutions or the bio-light element prepared by the method of the above technical solutions in a medical plaster and a textile.

The present disclosure provides a bio-light element, including the following components in parts by mass: 15-35 parts of a jade, 20-40 parts of a stone needle, 20-35 parts of a silicon dioxide ore, and 10-25 parts of zinc oxide. In the present disclosure, the jade has high-intensity electrons, which makes it possible to stimulate endocrine of a human body, regulate metabolism, and meanwhile stimulate acupuncture points of the human body, thus playing a therapeutic role. As a far-infrared material, silicon dioxide has the functions of absorbing external light energy and heat energy and converting them into far-infrared light, and has the effect of producing a photochemical action, a photothermal action and a photoionization action on the human body, which could promote the temperature rise in a deep subcutaneous layer, dilate microvessels, promote blood circulation, and eliminate congestion and the like obstacles that hinder metabolism. The stone needle could promote blood microcirculation by the far infrared rays thereof, and has the functions of calming the nerves, regulating qi and blood, and dredging meridians, and plays some therapeutic and health care roles through microcrystalline infrared and pulses. Zinc oxide has good biocompatibility and relatively higher biological activity and could play a certain bactericidal and bacteriostatic role, but it is difficult to meet the requirements, and after zinc oxide is used in combination with the jade, stone needle and silicon dioxide, they could produce a synergistic effect, which improves the bactericidal and bacteriostatic effects on *Staphylococcus aureus, Escherichia coli.* and *Candida albicans* and also improves the deodorization effect of the bio-light element. The results of the examples show that under the condition that the bio-light element provided by the present disclosure is added into a textile in an amount of 2-5%, the resulting textile has a bacteriostasis rate against *Staphylococcus aureus* of not lower than 99%, a bacteriostasis rate against *Escherichia coli.* of not lower than 70%, a bacteriostasis rate against *Candida albicans* of not lower than 99%, a deodorization rate after washing for 10 times of not lower than 70%, and a far infrared emissivity of not lower than 0.85; under the condition that the bio-light element is added into a medical analgetic plaster in an amount of 5-20%, the resulting medical analgetic plaster has a far infrared emissivity of not lower than 0.87.

DETAILED DESCRIPTION OF THE EMBODIMENTS

The present disclosure provides a bio-light element, including the following components in parts by mass: 15-35 parts of a jade, 20-40 parts of a stone needle, 20-35 parts of a silicon dioxide ore, and 10-25 parts of zinc oxide.

The bio-light element provided by the present disclosure includes, in parts by mass, 15-35 parts, preferably 20-25 parts, and more preferably 23 parts of the jade. In the present disclosure, there is no specific limitation on the type of the jade, and a commercially-available product well known to those skilled in the art may be used. In the present disclosure, the jade has high-intensity electrons, and electron diffraction thereof could release enough bioelectricity to affect a human body, which could stimulate endocrine and regulate metabolism. Meanwhile, the jade has a special photoelectric effect, and forms an electromagnetic field in the process of cutting, grinding and polishing, and these effects are accumulated to form a resonator, which could resonate with the human body and make all parts of the human body operate more harmoniously. In addition, the jade contains various beneficial trace elements such as zinc, copper, germanium, cobalt, nickel, manganese and selenium, which infiltrate into the human body and could balance physiological functions and play a role in health care. Moreover, the jade could emit fluorescence and color light, stimulate acupuncture points of the human body, and play a role in treatment and health care.

In some embodiments of the present disclosure, the jade has a median particle size ($D_{50}$) of not larger than 1 μm, and preferably $D_{50} \leq 0.8$ μm. In some embodiments, the jade has a purity of not lower than 95 wt. %, preferably not lower than 96 wt. %, and more preferably not lower than 97 wt. %. In some embodiments, the jade has a density of 2.4-4.2 kg/L, preferably 2.6-4.0 kg/L, and more preferably 3.0-3.9 kg/L. In the present disclosure, the parameters of the jade are limited within the above ranges, so that the photoelectric effect of the jade could be fully exerted, thereby further improving the health care effect of the bio-light element.

Based on 15-35 parts by mass of the jade, the bio-light element provided by the present disclosure includes 20-40 parts, preferably 30-40 parts, and more preferably 35 parts of the stone needle. In the present disclosure, the stone needle could promote blood microcirculation by the far infrared rays thereof, and has the functions of calming the nerves, regulating qi and blood, and dredging meridians, and plays a role of therapeutic and health care through microcrystalline infrared and pulses.

In some embodiments of the present disclosure, the stone needle has a median particle size ($D_{50}$) of not larger than 1 μm, and preferably $D_{50} \leq 0.8$ μm. In some embodiments, the stone needle has a purity of not lower than 95 wt. %, preferably not lower than 96 wt. %, and more preferably not lower than 97 wt. %. In some embodiments, the stone needle has a density of 2.5-2.9 kg/L, preferably 2.6-2.85 kg/L, and more preferably 2.8 kg/L. In the present disclosure, by limiting the parameters of the stone needle within the above ranges, the efficacy of the stone needle could be further improved.

Based on 15-35 parts by mass of the jade, the bio-light element provided by the present disclosure includes 20-35 parts, preferably 25-30 parts, and more preferably 28 parts of the silicon dioxide ore. In the present disclosure, the silicon dioxide ore is a far-infrared material with radioactivity, resonance absorbency and permeability, which could absorb external light energy and heat energy and convert them into far infrared light, produce a photochemical action, a photothermal action and a photoionization action on the human body. The infrared light could penetrate deep into skin and subcutaneous tissues, induce vibration of atoms and molecules, and then form a thermal reaction through resonance absorption of the vibration, which promotes the temperature rise in a deep subcutaneous layer, dilates microvessels, promotes blood circulation, eliminates congestion and the like obstacles that hinder metabolism, makes the tissue rejuvenate, promotes enzyme production, and excretes the old things and harmful accumulations that are originally stranded in the body to the outside of the body through sweat glands after metabolism. Meanwhile, silicon dioxide also has a comprehensive biological effect, namely an electromagnetic wave effect, a trace element effect, a thermal effect and an enzyme effect, which could improve the microcirculation of the human body.

In some embodiments of the present disclosure, the silicon dioxide ore has a median particle size ($D_{50}$) of not larger than 1 μm, and preferably $D_{50} \leq 0.8$ μm. In some embodiments, the silicon dioxide ore has a purity of not lower than 95 wt. %, preferably not lower than 96 wt. %, and more preferably not lower than 97 wt. %. In some embodiments, the silicon dioxide ore has a density of 2.5-2.9 kg/L, preferably 2.6-2.8 kg/L, and more preferably 2.65 kg/L. In the present disclosure, by limiting the parameters of the silicon dioxide ore within the above ranges, the far infrared radiation efficiency of the silicon dioxide ore could be further improved.

Based on 15-35 parts by mass of the jade, the bio-light element provided by the present disclosure includes 10-25 parts, preferably 15-20 parts, and more preferably 18 parts of zinc oxide. In the present disclosure, the zinc oxide has good biocompatibility and relatively higher bioactivity, and has a bacteriostasis rate against *Staphylococcus aureus* of 80%, a bacteriostasis rate against *Escherichia coli.* of 70%, a bacteriostasis rate against *Candida albicans* of 60%, and a deodorization rate of 65%, and could produce a synergistic effect with the jade, stone needle and silicon dioxide, thereby significantly improving the bactericidal and bacteriostatic effects on bacteria such as *Staphylococcus aureus, Escheri-*

*chia coli*, and *Candida albicans*, while improving the deodorization effect of the bio-light element.

In some embodiments of the present disclosure, zinc oxide has a median particle size ($D_{50}$) of not larger than 1 μm, and preferably $D_{50} \leq 0.8$ μm. In the present disclosure, by limiting the parameters of zinc oxide within the above ranges, the bactericidal and bacteriostatic effects and deodorization efficiency of zinc oxide could be further improved.

The bio-light element provided by the present disclosure has various health care functions such as an anti-microbial effect, a cosmetic effect, regulation of physiological functions, and promotion of microcirculation.

The present disclosure further provides a method for preparing the bio-light element described in the above technical solutions, including the following steps:

(1) respectively subjecting the jade, the stone needle and the silicon dioxide ore to a pulverizing, a wet ball milling and an ultrafine pulverizing sequentially to obtain an ultrafine jade, an ultrafine stone needle and an ultrafine silicon dioxide ore;

(2) mixing zinc oxide with a part of the ultrafine jade obtained in step (1), and subjecting the resulting mixture to an ultrafine pulverizing to obtain an ultrafine mixture; and (3) mixing the ultrafine stone needle, the ultrafine silicon dioxide ore and the rest ultrafine jade obtained in step (1) with the ultrafine mixture obtained in step (2) to obtain the bio-light element.

In the present disclosure, the jade, stone needle and silicon dioxide ore are respectively subjected to the pulverizing, the wet ball milling and the ultrafine pulverizing sequentially to obtain an ultrafine jade, an ultrafine stone needle and an ultrafine silicon dioxide ore.

In some embodiments of the present disclosure, the jade, stone needle and silicon dioxide ore are respectively subjected to a beneficiation before the pulverizing. In some embodiments of the present disclosure, impurities in the raw materials could be removed by subjecting the jade, stone needle and silicon dioxide ore to a beneficiation, so that the jade, stone needle and silicon dioxide ore could be purified to a purity of not lower than 95 wt. %, thereby further improving the effect of the bio-light element.

In some embodiments of the present disclosure, the pulverizing is carried out in a Raymond mill. In some embodiments of the present disclosure, the pulverized product has a particle size of not lower than 300 meshes. In the present disclosure, there is no specific limitation on the specific model of the Raymond mill, and a commercially-available Raymond mill well known to those skilled in the art may be used. In the present disclosure, by pulverizing the raw materials, the particle size of the raw materials could be preliminarily reduced, which is convenient for subsequent further processing.

In some embodiments of the present disclosure, the wet ball milling is carried out in a ball mill. In some embodiments of the present disclosure, the product obtained after the wet ball milling has a median particle size ($D_{50}$) of not larger than 1 μm. In the present disclosure, there is no specific limitation on the specific model of the ball mill, and a commercially-available ball mill well known to those skilled in the art may be used. In the present disclosure, processing the materials by the wet ball milling makes it possible to further reduce the particle size of the raw materials.

In some embodiments of the present disclosure, after the wet ball milling is finished, the obtained product is dried. In the present disclosure, there is no specific limitation on the means of drying, as long as the materials could be dried.

In some embodiments of the present disclosure, the ultrafine pulverizing is carried out in a jet mill. In the present disclosure, there is no specific limitation on the specific model of the jet mill, and a commercially-available jet mill well known to those skilled in the art may be used. In the present disclosure, the product obtained after the ball milling could be completely dispersed by the means of the ultrafine pulverizing.

In the present disclosure, after the ultrafine jade, ultrafine stone needle and ultrafine silicon dioxide ore are obtained, zinc oxide is mixed with a part of the ultrafine jade, and the resulting mixture is subjected to an ultrafine pulverizing to obtain an ultrafine mixture.

In some embodiments of the present disclosure, a mass ratio of zinc oxide to the part of the ultrafine jade is in a range of 5:(1-2) (5:1 to 5:2), and preferably 5:1. In the present disclosure, by mixing zinc oxide with the ultrafine jade and then pulverizing the resulting mixture, it is possible to solve the problems of poor dispersibility and incapability of independent processing caused by agglomeration and viscosity of zinc oxide, thereby improving the dispersibility of zinc oxide.

In some embodiments of the present disclosure, the ultrafine mixture has a median particle size ($D_{50}$) of not larger than 1 μm, and preferably $D_{50} \leq 0.8$ μm. In some embodiments of the present disclosure, the ultrafine pulverizing is carried out in a jet mill. In the present disclosure, there is no specific limitation on the specific model of the jet mill, and a commercially-available jet mill well known to those skilled in the art may be used. In the present disclosure, the means of the ultrafine pulverizing could make it possible to obtain a particle size of zinc oxide meeting the use requirements.

In the present disclosure, after the ultrafine mixture is obtained, the ultrafine stone needle, the ultrafine silicon dioxide ore and the rest of the ultrafine jade are mixed with the ultrafine mixture to obtain the bio-light element.

In some embodiments of the present disclosure, the mixing is carried out in a jet mill. In the present disclosure, there is no specific limitation on the specific model of the jet mill, and a commercially-available jet mill well known to those skilled in the art may be used. In the present disclosure, it is beneficial to the uniform mixing of respective components by using ultrafine pulverizing.

The preparation method provided by the present disclosure is simple, could be completed just by adopting the existing devices, and meanwhile could overcome the problem of poor dispersibility of zinc oxide, which is beneficial to further improving the medical care effect of the bio-light element.

The present disclosure provides use of the bio-light element described in the above technical solutions or the bio-light element prepared by the method of the above solutions in a medical plaster and a textile.

In some embodiments of the present disclosure, under the condition that the bio-light element is applied to the medical plaster, a percentage mass content of the bio-light element in the medical plaster is in a range of 5-20%, and preferably 10-15%. In the present disclosure, by limiting the dosage of the bio-light element within the above ranges, it could ensure that the medical plaster has good bactericidal and bacteriostatic effects, and meanwhile has high far infrared emissivity.

In some embodiments of the present disclosure, under the condition that the bio-light element is applied to a textile, a percentage mass content of the bio-light element in the textile is 2-5%, and preferably 3-4%. In some embodiments of the present disclosure, the textile includes socks, underwear and beddings. In the present disclosure, by limiting the dosage of the bio-light element within the above ranges, it is possible to avoid the adverse impact on the mechanical properties of the textile caused by excessive dosage of the bio-light element, and meanwhile to ensure good bactericidal and bacteriostatic effects and high deodorization effect.

The bio-light element provided by the present disclosure is used in the medical plaster and the textile, and has good bactericidal and bacteriostatic effects and high deodorization rate, and meanwhile has high far infrared emissivity.

The technical solutions according to the present disclosure will be clearly and completely described below in conjunction with examples of the present disclosure. Apparently, the described embodiments are merely a part rather than all of the embodiments of the present disclosure. All other embodiments obtained by those of ordinary skill in the art based on the embodiments of the present disclosure without creative efforts shall fall within the claimed scope of the present disclosure.

Example 1

A bio-light element consisted of the following components in parts by mass: 20 parts of a jade, 35 parts of a stone needle, 30 parts of a silicon dioxide ore, and 15 parts of zinc oxide.

A method for preparing the bio-light element was conducted as follows:
(1) The jade, stone needle and silicon dioxide ore were respectively subjected to a beneficiation, making the purity of the jade, stone needle and silicon dioxide ore not lower than 95 wt. %. The jade, stone needle and silicon dioxide ore after the beneficiation were then respectively put into a Raymond mill and pulverized to a particle size of not lower than 300 meshes, then put into a ball mill for a wet ball milling to a median particle size ($D_{50}$) of not larger than 1 μm. The wet ball milled jade, stone needle and silicon dioxide ore were respectively dried, put into a jet mill, and subjected to an ultrafine pulverizing, obtaining an ultrafine jade, an ultrafine stone needle and an ultrafine silicon dioxide ore.
(2) Zinc oxide was mixed with a part of the ultrafine jade obtained in step (1), and the resulting mixture was subjected to an ultrafine pulverizing, obtaining an ultrafine mixture with a median particle size ($D_{50}$) of not larger than 1 μm, wherein a mass ratio of zinc oxide to the part of the ultrafine jade was 5:1.
(3) The ultrafine stone needle, the ultrafine silicon dioxide ore and the rest ultrafine jade obtained in step (1) were mixed with the ultrafine mixture obtained in step (2), obtaining the bio-light element.

Example 2

A bio-light element consisted of the following components in parts by mass: 30 parts of a jade, 25 parts of a stone needle, 20 parts of a silicon dioxide ore and 25 parts of zinc oxide. The preparation method of the bio-light element was the same as that of Example 1.

Example 3

A bio-light element consisted of the following components in parts by mass: 35 parts of a jade, 20 parts of a stone needle, 35 parts of a silicon dioxide ore and 10 parts of zinc oxide. The preparation method was the same as that of Example 1.

Use Example 1

In this example, the bio-light element prepared in Example 2 was added into a spandex fabric, wherein a percentage mass content of the bio-light element in the spandex fabric was 3%.

Use Example 2

In this example, the spandex fabric obtained in Use Example 1 was washed for 10 times.

Use Example 3

In this example, the spandex fabric obtained in Use Example 1 was washed for 50 times.

Use Example 4

The bio-light element prepared in Example 3 was added into a medical ointment, wherein a percentage mass content of the bio-light element in the medical ointment was 10%.

Comparative Example 1

This example provided a spandex fabric without the bio-light element.

The ammonia removal performances of the spandex fabrics obtained in Use Examples 1-2 and Comparative Example 1 were tested, and the ammonia removal performance evaluation test was conducted by using a method specified in the SEK mark fiber product certification standard, and the results were as shown in Table 1:

TABLE 1

Ammonia removal performance of spandex fabrics obtained in Use Examples 1-2 and Comparative Example 1

| | Initial concentration/ppm | Concentration after 2 h/ppm | Reduction rate/% |
| --- | --- | --- | --- |
| Use Example 1 | 100 | 14 | 83 |
| Use Example 2 | 100 | 22 | 73 |
| Comparative Example 1 | 100 | 82 | — |

The reduction rate in Table 1 was calculated by the following formula:

Reduction rate=(blank concentration after 2 $h$–concentration after 2 $h$)/concentration after 2 $h$;

wherein, the blank concentration after 2 h refers to the concentration after 2 h in Comparative Example 1, and the concentration after 2 h refers to the concentration after 2 h in Use Examples.

The anti-microbial and bacteriostatic properties of the spandex fabric provided in Use Example 3 were tested, and the results are shown in Table 2:

TABLE 2

Test results of the anti-microbial and bacteriostatic properties
of the spandex fabric obtained in Use Example 3

| Bacterial species | Unit | Technical requirement AAA | Detection Result | Judgment of single item |
|---|---|---|---|---|
| Staphylococcus aureus (ATCC 6538) | % | ≥80 | >99 | Qualified |
| Escherichia coli. (ATCC 25922) | % | ≥70 | 70 | Qualified |
| Candida albicans (ATCC 10231) | % | ≥60 | 99 | Qualified |

It can be seen from Table 1 that the ammonia removal rate of the spandex fabric added with the bio-light element provided by the present disclosure reaches 83%, and even after washing for 10 times, the ammonia removal rate could still reach 73%, which far exceeds the removal effect of the spandex fabric without the bio-light element, indicating that the bio-light element provided by the present disclosure has a good deodorization effect.

It can be seen from Table 2 that the spandex fabric added with the bio-light element provided by the present disclosure has a good inhibitory effect on *Staphylococcus aureus*, *Escherichia coli.* and *Candida albicans*, and the inhibitory effect still greatly exceeds the technical requirements even after washing for 50 times, showing that the bio-light element provided by the present disclosure has good bactericidal and bacteriostatic effects, and meanwhile showing that zinc oxide could produce a synergistic effect with the jade, stone needle and silicon dioxide, thus improving the bactericidal and bacteriostatic effects of the bio-light element on bacteria such as *Staphylococcus aureus, Escherichia coli.* and *Candida albicans*, while improving the deodorization effect of the bio-light element.

The far infrared emissivity of the spandex fabric provided in Use Example 1 was tested, and it was found upon detection that the spandex fabric has a far infrared emissivity of not lower than 0.85, indicating that the bio-light element provided by the present disclosure has relatively higher far infrared emissivity, and could significantly improve the far infrared emissivity of a textile fabric when added into the textile fabric.

The far infrared emissivity of the medical ointment provided in Application Example 4 was tested, and it was found upon detection that the medical ointment had a far infrared emissivity of not lower than 0.87, indicating that the bio-light element provided by the present disclosure had relatively higher far infrared emissivity, and could significantly improve the far infrared emissivity of a textile fabric when added into the medical ointment.

The above description is only preferred embodiments of the present disclosure. It should be pointed out that, for those of ordinary skill in the art, several improvements and modifications could be made without departing from the principle of the present disclosure. These improvements and modifications should also be considered as falling within the claimed scope of the present disclosure.

What is claimed is:

1. A bio-light element, comprising the following components in parts by mass: 15-35 parts of a jade, 20-40 parts of a stone needle, 20-35 parts of a silicon dioxide ore, and 10-25 parts of zinc oxide.

2. The bio-light element of claim 1, wherein each of the jade, stone needle, silicon dioxide ore and zinc oxide independently has a median particle size ($D_{50}$) of not larger than 1 μm.

3. The bio-light element of claim 1, wherein each of the jade, stone needle and silicon dioxide ore independently has a purity of not lower than 95 wt. %.

4. The bio-light element of claim 1, wherein the jade has a density of 2.4-4.2 kg/L.

5. The bio-light element of claim 1, wherein the stone needle has a density of 2.6-2.9 kg/L.

6. The bio-light element of claim 1, wherein the silicon dioxide ore has a density of 2.5-2.9 kg/L.

7. The bio-light element of claim 1, comprising the following components in parts by mass: 20-25 parts of the jade, 30-40 parts of the stone needle, 25-30 parts of the silicon dioxide ore, and 10-25 parts of the zinc oxide.

8. The bio-light element of claim 7, wherein each of the jade, stone needle, silicon dioxide ore and zinc oxide independently has a median particle size ($D_{50}$) of not larger than 1 μm.

9. The bio-light element of claim 7, wherein each of the jade, stone needle and silicon dioxide ore independently has a purity of not lower than 95 wt. %.

10. The bio-light element of claim 7, wherein the jade has a density of 2.4-4.2 kg/L.

11. The bio-light element of claim 7, wherein the stone needle has a density of 2.6-2.9 kg/L.

12. The bio-light element of claim 7, wherein the silicon dioxide ore has a density of 2.5-2.9 kg/L.

13. A method for preparing the bio-light element of claim 1, comprising the following steps:
    (1) respectively subjecting the jade, the stone needle and the silicon dioxide ore to a pulverizing, a wet ball milling and an ultrafine pulverizing sequentially to obtain an ultrafine jade, an ultrafine stone needle and an ultrafine silicon dioxide ore;
    (2) mixing zinc oxide with a part of the ultrafine jade obtained in step (1), and subjecting the resulting mixture to an ultrafine pulverizing to obtain an ultrafine mixture; and
    (3) mixing the ultrafine stone needle, the ultrafine silicon dioxide ore and the rest ultrafine jade obtained in step (1) with the ultrafine mixture obtained in step (2) to obtain the bio-light element.

14. The method of claim 13, wherein in step (2), a mass ratio of zinc oxide to the part of the ultrafine jade is in a range of 5:1 to 5:2.

15. The method of claim 13, wherein the bio-light element comprises the following components in parts by mass: 20-25 parts of the jade, 30-40 parts of the stone needle, 25-30 parts of the silicon dioxide ore, and 10-25 parts of the zinc oxide.

16. The method of claim 13, wherein each of the jade, stone needle, silicon dioxide ore and zinc oxide independently has a median particle size ($D_{50}$) of not larger than 1 μm.

17. The method of claim 13, wherein each of the jade, stone needle and silicon dioxide ore independently has a purity of not lower than 95 wt. %.

18. The method of claim 13, wherein the jade has a density of 2.4-4.2 kg/L, the stone needle has a density of 2.6-2.9 kg/L, and the silicon dioxide ore has a density of 2.5-2.9 kg/L.

19. A medical plaster, comprising the bio-light element of claim 1.

20. A textile, comprising the bio-light element of claim 1.

* * * * *